Figure 1:
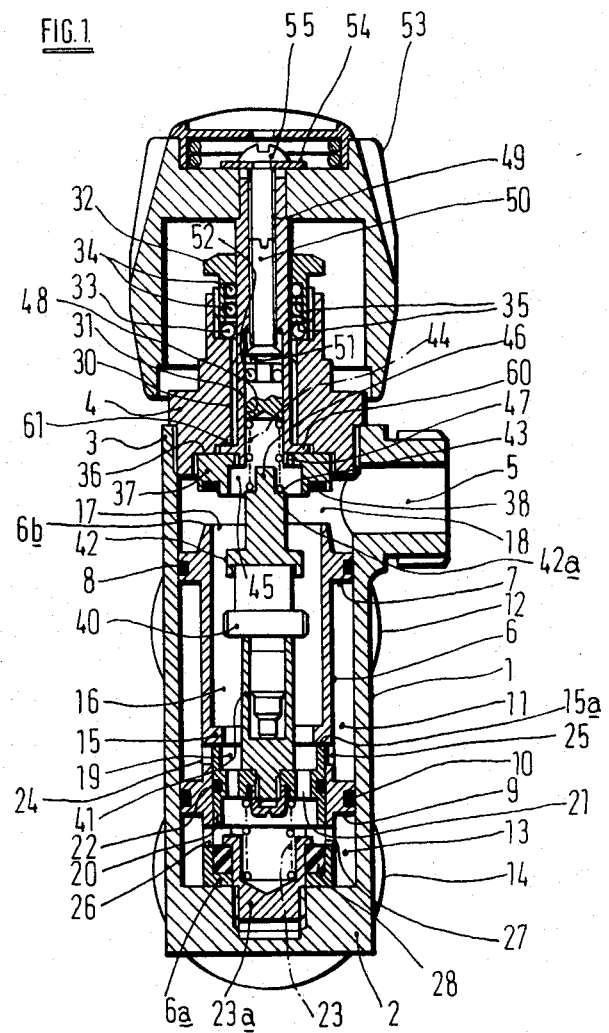

United States Patent [19]

Bendall et al.

[11] Patent Number: 4,607,788
[45] Date of Patent: Aug. 26, 1986

[54] MIXING VALVE

[75] Inventors: Brian Bendall, Nr. Newport; Stephan W. Flannery, Wolverhampton, both of England

[73] Assignee: Meynell Valves Limited, Wolverhampton, England

[21] Appl. No.: 655,543

[22] Filed: Sep. 28, 1984

Related U.S. Application Data

[63] Continuation of Ser. No. 489,100, Apr. 27, 1983, abandoned, which is a continuation-in-part of Ser. No. 422,948, Sep. 24, 1982, Pat. No. 4,509,677.

[30] Foreign Application Priority Data

May 26, 1982 [GB] United Kingdom ............... 8215409
Mar. 3, 1983 [GB] United Kingdom ............... 8305916

[51] Int. Cl.$^4$ .................................. G05D 23/13
[52] U.S. Cl. .......................... 236/12.2; 236/12.21; 251/358
[58] Field of Search ............. 236/12.16, 12.2, 12.21, 236/12.22; 251/358

[56] References Cited

U.S. PATENT DOCUMENTS

| 3,119,408 | 1/1964 | Patrick ................... 251/358 X |
| 3,765,604 | 10/1973 | Trubert et al. ............ 236/12.2 |
| 3,792,812 | 2/1974 | Knapp ...................... 236/12.2 |
| 3,827,016 | 7/1976 | Knapp ...................... 236/12.2 |
| 3,929,283 | 12/1975 | Delpla ..................... 236/12.2 |
| 3,955,759 | 5/1976 | Knapp ...................... 236/12.2 |
| 4,029,256 | 6/1977 | Dauga ...................... 236/12.2 |
| 4,164,321 | 8/1979 | Riis ........................ 236/12.2 |

Primary Examiner—William E. Wayner
Attorney, Agent, or Firm—Kenway & Jenney

[57] ABSTRACT

Disclosed is a valve for mixing hot and cold water consisting of a hollow body closed at one end and including an internal sleeve located by two annular flanges that define chambers between the sleeve and the body communicating, respectively, with hot and cold water inlets. Each chamber communicates with the interior of the sleeve by a radially directed passageway. A temperature actuated piston slides within the sleeve between a first valve seat formed by a face of a third annular flange extending inwardly of the sleeve above the cold water passageway to close the cold water passageway and leave the hot water passageway open and a second valve seat located at the bottom of the sleeve to close the hot water passageway and leave the cold water passageway open. The cold water passageway communicates directly with the mixing chamber formed in the sleeve and hot water passageway communicates with the mixing chamber via axial passageways formed in the piston. Movement of the piston between the first and second valve seats is limited to 0.5 mm. The top of the body is closed by a tap head which includes means for controlling the rate of flow of fluid through the outlet and means for regulating the temperature flow in the mixing chamber.

20 Claims, 4 Drawing Figures

MIXING VALVE

This is a continuation of application Ser. No. 489,100, filed Apr. 27, 1983, now abandoned, which in turn is a continuation-in-part of U.S. application Ser. No. 422,948, filed Sept. 24, 1982, now U.S. Pat. No. 4,509,677.

The present invention relates to an improved valve for mixing hot and cold water and provides for accurate outlet temperature control.

Shower bath systems that draw heated water from a hot water supply frequently incorporate thermostatically controlled mixing valves in order to control the temperature of water to the shower head by allowing the hot water to mix with a controlled flow of cold water from the mains supply. Owing to variations in the pressure of water in the system delivering hot and cold water to the mixing valve which may arise, for example, through water being drawn off from other points in the system, however it is extremely difficult to stabilise the temperature of the water supply from the valve e.g. a sudden drop in cold water pressure may cuase a surge in the temperature of the water delivered from the valve.

Over the years numerous attempts have been made to design a valve for mixing hot and cold water that will provide water having a stable outlet temperature.

Thus British Pat. Nos. 885,752 and 1,108,580 disclose mixing valves in which a duplex cone valve controls the flow of hot and cold water into the valve mixing chamber. British Pat. Nos. 969,925, 1,328,659, 1,407,512 and 1,496,329 disclose valves in which the supply of hot and cold water into the mixing chamber is controlled by various forms of pistons slidable within sleeves contained in the valves to effect the opening and closure of apertures formed in the walls of the sleeves and through which the said hot and cold water pass on-route for the mixing chamber. Generally the pistons are urged into positions that close the apertures communicating with a cold water inlet by spring means and into positions that close the apertures communicating with a hot water inlet by a temperature responsive device positioned in the mixing chamber. However in each of the disclosures in the last mentioned patents the pistons operate to close at least one of the said apertures by a sliding movement across the aperture. Thus the pistons make relatively large movements within the valve between the positions in which they close the apertures communicating with the hot water inlets and the positions in which they close the apertures communicating with the cold water inlet.

To date none of the valves provides the required degree of stability in the outlet temperature of the mixed hot and cold water, the requirement for which is that the temperature should not vary by more than ±2° C.

The mixing valve of the present invention is designed to provide the required degree of temperature stability.

The object of the invention is achieved by utilising a piston that seats positively against two valve seats to close respective hot and cold water inlets into the valve mixing chamber and has a maximum movement between those positions not exceeding 0.4–0.6 mm.

Accordingly, therefore, the present invention provides a valve for controlling the mixing of hot and cold liquids comprising; a hollow body having one end closed by a tap head, inlets for hot and cold liquids communicating via fluid passageways with a mixing chamber in which the aforesaid liquids mix, an outlet for the mixed liquid communicating with said mixing chamber, and including a valve means for controlling the rate of flow of liquids from the respective hot and cold inlets via passageways into the mixing chamber, a temperature responsive device located in the said mixing chamber and arranged to regulate the position of the said valve means to maintain the liquids in the mixing chamber at a substantially stable temperature, and control means operative through said tap head to open and close a shutoff valve between said mixing chamber and said mixed liquids outlet and to select the temperature of said mixed liquids up to a predetermined maximum temperature; wherein said valve means comprises a piston movable between a first position in which it seats against a first valve seat to restrict the flow of liquid from the cold inlet from entering the said mixing chamber whilst permitting liquid from the hot liquid inlet to enter the said mixing chamber and a second position in which it seats against a second valve seat whereby it prevents liquid from the hot liquid inlet from entering the said mixing chamber whilst permitting liquid from the cold liquid inlet to enter the said mixing chamber, said movement not exceeding 0.4 to 0.6 mm.

In one form the temperature responsive device may be a diaphragm element.

In a preferred form the valve includes means to control the rate of flow of mixed fluids from the valve, e.g. by manual rotation of a control knob.

Figure 2:
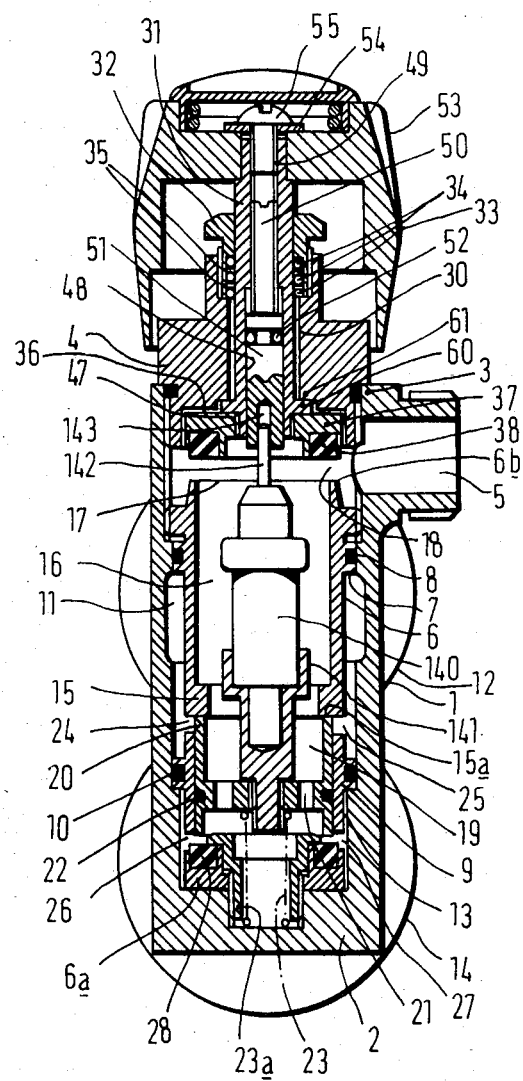
Figure 3:
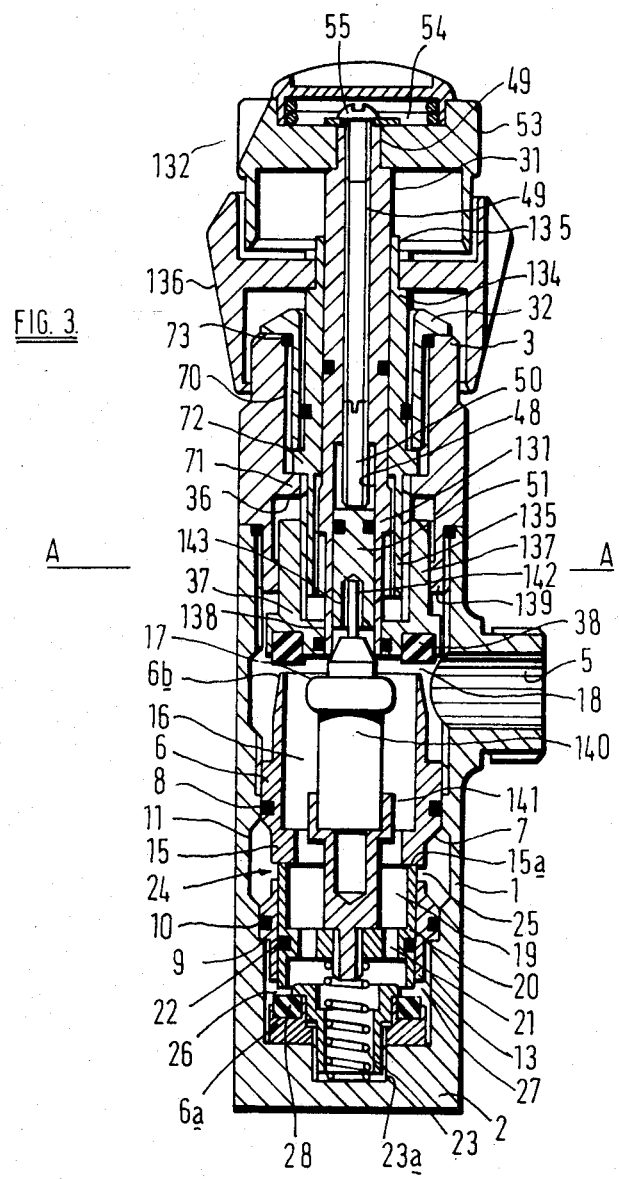
Figure 4:
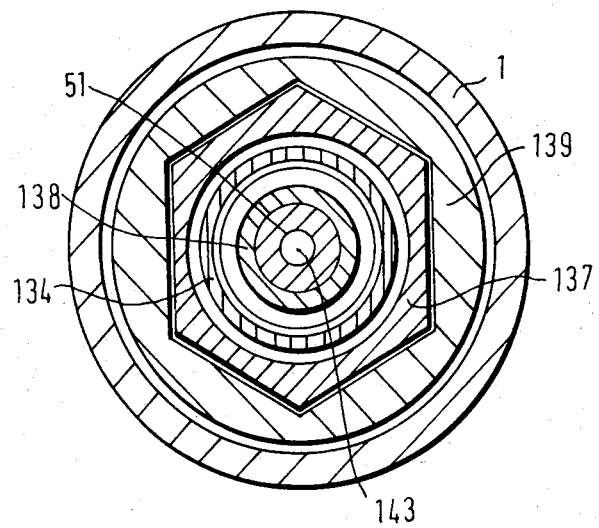

The invention will now be described by reference to the accompanying drawings which illustrate embodiments of the invention as applied to a valve controlling the mixing of hot and cold water. In the drawings:

FIG. 1 is a vertical section of one embodiment of a valve according to the present invention, FIG. 2 is a vertical section of another embodiment of a valve according to the present invention, FIG. 3 is a vertical section through a preferred embodiment of a valve according to the present invention, and FIG. 4 is a cross section through A—A of FIG. 3.

In the drawings the component parts are in the positions occupied when the valves are in the open position for the supply of hot water only to the mixed water outlet. For convenience in the following description, the parts will be referred to as though the valves were oriented in the vertical position.

Referring to FIG. 1, a valve comprises a hollow cylindrical body 1 having a closed end 2 and an open end 3 in which head 4 is located in fluid tight engagement therewith. An outlet 5 for mixed fluids is positioned adjacent end 3 of body 1.

A cylindrical sleeve 6 is positioned within body 1 to lie between end 2 and outlet 5. Sleeve 6 includes an upper outwardly extending annular flange 7 and a lower outwardly extending annular flange 9 maintained in fluid tight engagement with the inside wall of body 1 by means of O-rings 8 and 10 respectively. Sleeve 6 flanges 7 and 9 and inside wall of body 1 defines a cold water chamber 11 that communicates with cold water inlet 12. Flange 9, end 2 and inside wall of body 1 define a hot water chamber 13 that communicates with hot water inlet 14.

The upper surface of flange 15 extending radially inwardly of sleeve 6 forms, together with sleeve 6, a fluid mixing chamber 16 that communicates with outlet 5 through open end 17 of sleeve 6 and mixed fluid chamber 18. Chamber 18 is formed between flange 7, head 4 and body 1.

The lower surface of flange 15 forms a first valve seat 15a and further defines the upper limit of a cylindrical chamber 19 formed in sleeve 6 between flange 15 and the closed lower end 6a of sleeve 6.

A cylindrical piston 20 having an H-shaped cross section is located within lower chamber 19 of sleeve 6 and contains axially directed passageways 21 formed within the horizontal portions thereof. Piston 20 is maintained in fluid tight engagement with sleeve 6 through O-ring 22 and is urged upwardly into engagement with valve seat 15a by means of spring 23 which is retained in cup 23a.

Arcuate passageways 24 and 25 are formed in sleeve 6 immediately below flange 15 to provide communication between the upper portion of chamber 19 and the cold water chamber 11. Passageways 24 and 25 are closed when piston 20, under the influence of spring 23 seats against seat 15a of flange 15 and makes fluid tight engagement therewith.

Arcuate slots 26 and 27 are formed in sleeve 6 adjacent the lower end 6a thereof to provide communication with the lower end of chamber 19 and the hot water inlet 14. A washer 28 formed of a hard rubber is positioned within the lower end 6a of sleeve 6 and adjacent slots 26 and 27 to provide a second valve seat against which piston 20 can be urged into fluid tight engagement as herein after described, to close arcuate slots 26 and 27 and hence prevent the flow of hot water to chamber 19. The gap between the lower end of piston 20 and valve seat washer 28, when the upper end of piston 20 engages seat 15a is 0.5 mm.

The lower end of head 4 is machined out to form a cup 36 in which is received a shut-off clack 37 having a seat 38 in the lower surface thereof.

An axial passageway 30 is formed in head 4 and is tapped to receive hollow spindle 31 externally screw threaded at its lower end that is maintained in fluid tight engagement with head 4 through the interaction of gland 32, O-rings 33 and 34 and packing washers 35. The lower end of spindle 31 projects downwardly and into screwthreaded engagement with hollow passageway 47 formed in clack 37. An outwardly extending flange 60 provides a surface against which the top of clack 37 engages. The upper surface of flange 60 is shown contacting shoulder 60 formed in cup 36 of head 4.

A sensitive temperature responsive diaphragm element 40 selected for the required temperature range, is positioned within mixing chamber 16 and has one end retained in cup 41 which in turn is located in the horizontal portion of piston 20. The opposite end of the temperature responsive element 40 is received within the base of carrier 42 having a stem 42a shoulder 43 and peg 46 on which the lower end of overide spring 44 engages. The upper end of spring 44 projects through cup 45 formed in the base of clack 37 into the lower end 48 of hollow spindle 31.

Element 40 expands axially of body 1 when chamber 16 contains hot water. Thus with the valve fully open, as shown in FIG. 1, element 40 will be in an extended condition.

The upper end 49 of spindle 31 is tapped to receive a temperature adjusting screw 50. The lower end of screw 50 engages the top of screw follower 51 which is positioned in the lower portion 48 of hollow spindle 31 and the bottom of screw follower 51 engages the top of spring 44. Follower 51 is maintained in fluid tight engagement with spindle 31 through 0-ring 52.

A control knob 53 is mounted on the upper portion of spindle 31 for rotation therewith. The upper end of hollow spindle 31 is closed by screw 55 and washer 54.

The tension in spring 44 is arranged to be substantially greater than that of spring 23.

As shown in FIG. 1, the control knob 53 is in its uppermost position holding clack 37 in the fully open position with flange 60 in contact with shoulder 61 of cup 36. Piston 20 is seating against valve seat 15a, cold water inlet passageways 24 and 25 are closed and hot water is entering chamber 16 through inlet passageways 26 and 27 and piston passageways 21. Rotation of knob 53 in a clockwise direction causes spindle 31 to move downwardly through head 4 and force clack 37, through flange 60, downwardly towards sleeve 6. As spindle 31 moves through head 4, screw 50, follower 51 and spring 44 press against carrier 42 and hence apply pressure, through the temperature responsive element 40, to piston 20 and spring 23. Since spring 44 is stronger than spring 23 the latter is compressed causing piston 20 to move downwardly through sleeve 6 until it makes fluid tight engagement with valve seat 28 to close hot water slots 26 and 27. Cold water only now flows into chamber 16 and as a result element 40 contracts from its axially extended condition. Continual rotation of knob 53 compresses spring 44 between follower 51 and shoulder 43 and continues to move clack 37 downwardly until seat 38 engages the upper end 6a of sleeve 6 to stop the flow of water through outlet 5, i.e. to turn the valve off.

When a supply of water at a predetermined temperature is required the control knob 53 is rotated anti-clockwise to raise clack 37 and allow water to flow out through outlet 5. Initially the water flowing through outlet 5 will be cold and will remain cold whilst spring 44 remains compressed. When knob 53 has been rotated to the required extend spring 44 is no longer compressed and lower spring 23 forces piston 20 upwardly to open slots 26 and 27 and allow hot water to flow into chamber 19 through passageway 21 in piston 20 and into the mixing chamber 16. At the same time piston 20 is urged upwardly by spring 23 to engage with valve seat 15a thereby closing passageways 24 and 25 and preventing the flow of cold water into the mixing chamber. The warm water in mixing chamber 16 flows round the temperature responsive element 40, through the open end 17 of sleeve 6 into chamber 18 and thence through outlet 5.

As the temperature of the water in the mixing chamber approaches the predetermined temperature, the temperature responsive element expands and urges carrier 42 upwardly until the top of spring 44 engages follower 51 and pushes it into contact with the temperature adjusting screw 50. Continued expansion of temperature responsive element 40, as continuing flow of hot water into chamber 16 raises the temperature of the water therein, then causes piston 20 to move downwardly against spring 23, since spring 44 is stronger than spring 23, to close the hot water passageways 26 and 27 and open the cold water passageways 24 and 25 thereby allowing cold water back into the mixing chamber. Piston 20 acts to proportion the flow of hot and cold water through their respective passageways into the mixing chamber thereby providing a stable outlet temperature. When the maximum vertical movement of the piston between the first and second valve seats is limited to 0.5 mm the outlet temperature of the water is maintained to within ±1° C. of the predetermined value.

Movement of the piston by more than 0.5 mm, say between 0.4 to 0.6 mm reduces the stability of the outlet temperature of water and it may vary ±2° C. Any variation in excess of this value is unacceptable.

The temperature of the water flowing through outlet 5, up to a predetermined maximum, is controlled by the extent to which the control knob 53 is rotated in an anti-clockwise direction, the volume of water being fixed and controlled by the size of the arcuate slots, 24, 25; 26,27; formed in sleeve 6.

To set the maximum temperature available from the mixed hot and cold water in chamber 16, screw 55 is removed together with washer 54 to give access to the temperature adjusting screw 50, screw 50 is then adjusted to vary the extent of expansion of the temperature responsive element 40 that can take place before piston 20 is caused to seat against the second valve seat and close the hot water passageways 26 and 27. Rotation of the screw 50 in a clockwise direction forces the screw follower 51 down spindle 31 and reduces the maximum outlet temperature of the water and rotation in an anti-clockwise direction increases the maximum temperature.

The difference between the free and fully compressed lengths of spring 44 is arranged to be greater than the maximum degree of expansion of the temperature responsive element 40 thereby preventing damage occuring to that element if the piston 20 fails to close the hot water outlet 27.

The valve illustrated in FIG. 2 of the drawings is of generally similar construction to that of the valve of FIG. 1 and like parts are indicated by like numerals. In this embodiment, however, override spring 44 has been omitted. Temperature responsive device 140, having its lower end retained in cup 141 which is in turn received in the horizontal portion of piston 20, includes an upwardly extending plunger 142 the face end of which is slidingly received in blind passageway 143 formed in screw follower 51 positioned in the lower end 48 of hollow spindle 31. In this embodiment the valve seat washer 28 is required to be sufficiently resilient to allow the cylindrical walls of piston 20 to sink into its upper surface when under pressure as hereinafter described. For this purpose the washer is preferably formed from rubber having a shore hardness of 65–75.

As illustrated in FIG. 2 the valve has the control knob 53 in the fully open position, piston 20 is seating against valve seat 15a thus closing cold water inlet passageways 24 and 25 and allowing hot water to flow through passageways 26 and 27 into mixing chamber 16 via piston passageways 21. Since plunger 142 has not extended into the end of blind passageway 143 the temperature in chamber 16 has not reached its maximum.

When control knob 53 is rotated in a clockwise direction to its fully closed position, piston 20 indents the surface of valve seat 28 making fluid tight contact therewith and closing the hot water passageways 26 and 27, thus preventing hot water from entering chamber 19 and thence mixing chamber 16, and seat 38 of clack 37 is in fluid tight contact with the upper end 6b of sleeve 6 preventing the cold water from mixing chamber 16 from passing through outlet 5.

To open the valve control knob 53 is rotated in an anticlockwise direction to cause spindle 31 and shut off clack 37 to move upwardly thus releasing clack seat 36 from end 6a of sleeve 6 and allowing water to flow from the mixing chamber 16 through outlet 5 via chamber 18. Because piston 20 has indented valve seat washer 28 it will not move out of the fluid tight relationship with seat 28, under pressure from spring 23 with the initial opening of the valve and thus cold water only will pass through outlet 5. Cold water will continue to flow until knob 53 has been rotated sufficiently to cause the gap between end 6a of sleeve 6 and clack seat 28 to exceed about 0.07 to 0.1 mm depending upon the position of temperature adjusting screw 50 and hence screw follower 51, in spindle 31. Continuous rotation of knob 52 will allow spring 23 to force piston 20 away from seat 28 thus allowing hot water to flow from inlet 14 through chamber 13, passageways 26 and 27, in sleeve 6, passageway 21 in piston 20 into chamber 19 and thence into mixing chamber 16 where it mixes with the cold water. Rotation of knob 53 also causes spindle 31 and screw follower 51 to move upwardly with the result that plunger 142 is no longer in contact with the blind end of passageway 143.

As piston 20 moves upwards under the influence of spring 23 it contacts valve seat 15a to close cold water passageways 24 and 25. Since hot water only is now reaching mixing chamber 16 the temperature increases and the temperature responsive device 140 will expand causing plunger 142 to extend into passageway 143 until it contacts the end thereof. At this point continual increase in temperature of the water in the mixing chamber towards the predetermined temperature will cause the element 140 to continue to expand and cause cup 141 to push piston downwardly against spring 23 until it makes fluid tight contact with valve seat 28 thus closing hot water passageways 26 and 27 and opening cold water passageways 24 and 25 to allow cold water to enter the mixing chamber again. Piston 20 thus acts to proportion the flow of hot and cold water entering the mixing chamber via the inlet passageways 24, 25 and 26 and 27, whereby a stable outlet temperature is attained that varies by only ±1° C. for a given position of control knob 53, despite any variation in incoming water pressure that may occur. As with the embodiment of FIG. 1 the maximum vertical movement of piston 20 is limited to 0.5 mm. The maximum expansion/retraction of the temperature responsive element 140 and plunger 141 is arranged to be not more than 8 mm over the temperature range 27° C. to 76° C.

The valve illustrated in FIGS. 3 and 4 is similar to that of FIG. 2 and like parts are indicated by like reference numerals. However in this embodiment means are provided to control the volume of mixed fluids that flow through outlet 5.

Thus the lower end of cup 36 contains flange 139 having a hexagon shaped cross section and upper cylindrical portion 137 of clack 37 is formed to have an external hexagon cross section which is in sliding engagement with flange 139 of head 4.

A second cup 70 is machined in the upper portion of head 4 and is separated from lower cup 36 by an inwardly directed annular flange member 71.

An outer hollow spindle 134 includes an outwardly extending annular flange 72 that locates against flange 71, spindle 134 is retained in position by gland 32 which is in screw threaded engagement with the upper portion of cup 70 and sealed by O-ring 73. The lower portion of spindle 134 is externally screw threaded and extends through the opening formed by annular flange 71 into cylindrical portion 137 of clack 37 engaging with a complementary screw thread formed within the said cylindrical portion. An external fluid flow control knob 136 is non-rotatably attached to the upper portion 135 of spindle 134 which extends beyond gland 32 whereby rotation of knob 136 rotates spindle 134.

An inner hollow spindle 31 extends through gland 32, the lower end being located in fluid tight engagement with axial passageway 138 formed in clack 37. A lower portion 131 of spindle 31 is externally screw threaded and engages with a complementary internal screw thread formed in the lower portion of outer spindle 134.

A temperature control knob 53 is attached to the upper extending end portion 132 of spindle 31 for rotation thereof.

As illustrated in the drawings, the valve has the volume control knob 136 and temperature control knob 53 in the fully opened positions. Piston 20 is seen to be seating against valve seat 15a thus closing cold water inlet passageways 24 and 25 and allowing hot water to flow through passageways 26 and 27 into mixing chamber 16 via piston passageway 21.

When control knob 53 is rotated in a clockwise direction, spindle 31 moves downwardly through outer spindle 134 causing adjusting screw 50 and follower 51 to act through plunger 142 and apply pressure through temperature responsive element 140 to piston 20 and spring 23, whereby the latter is compressed allowing piston 20 to move and indent the surface of valve seat 28, thereby making fluid tight contact, to close the hot water passageways 26 and 27 thus preventing hot water from entering chamber 19 and hence mixing chamber 16. In this position cold water will continue to flow through passageways 25 and 24 and out through outlet 5. To shut off the valve completely control knob 136 is rotated clockwise thereby causing clack 37 to move downwardly until seat 38 makes fluid tight contact with the upper end 6b of sleeve 6 thus preventing water flowing from the mixing chamber 16 through outlet 5.

To obtain water at the desired temperature the volume control knob 136 is rotated in an anticlockwise direction to move clack 37 upwardly so that seat 38 moves away from upper end 6b of sleeve 6. Cold water is thereby allowed to flow, via inlet passageway 24 and 25 and chamber 19 into mixing chamber 16 around the temperature responsive element 140 out into chamber 18 and then through outlet 5. The temperature control knob 53 is then rotated in an anticlockwise direction which causes spindle 31 and the temperature control screw 50 to be withdrawn upwardly through outer spindle 134. Because there is no longer pressure on screw follower 51, spring 23 is able to expand and move piston 20 upwardly against seat 15a and to close the cold water inlets 24 and 25. Hot water then flows through passageways 26 and 27 into chamber 19 and thence into mixing chamber 16. The mixture of hot and cold water in mixing chamber 16 flows around the temperature responsive element 140 causing it to expand. As element 140 expands it forces plunger 142 to the end of blind passageway 143. At the predetermined temperature the plunger will reach the end of blind passageway 143 and further expansion of the temperature responsive device will then force piston 20 downwardly against spring 23 to close the hot water passageways 26 and 27 and open cold water passageways 24 and 25, thereby allowing cold water back into the mixing chamber. Piston 20 acts to proportion the flow of hot and cold water through the respective passageways into the mixing chamber thereby providing a stable outlet temperature that is maintained to within ±1° C. of the predetermined value.

The volume of water allowed out through outlet 5 is controlled by rotation of knob 136 between the closed and fully open positions.

We claim:
1. A valve for controlling the mixing of hot and cold liquids comprising:
a hollow body having one end closed by a tap-head, inlets for hot and cold liquids communicating via fluid passageways with a mixing chamber in which the aforesaid liquids mix, an outlet for the mixed liquids communicating with said mixing chamber, and including a valve means positioned adjacent the said mixing chamber for controlling the rate of flow of liquids from the respective hot and cold inlets via passageways into the mixing chamber, a temperature responsive device located in the said mixing chamber and arranged to regulate the position of the said valve means to maintain the liquids on the mixing chamber at a substantially stable temperature, and control means operative through said tap head to open and close a shut off valve between said mixing chamber and said mixed liquid outlet and to select the temperature of said mixed liquids up to a predetermined maximum temperature;
wherein said valve means comprises a piston movable between a first position in which it seats against a first valve seat to restrict the flow of liquid from the cold inlet from entering the said mixing chamber whilst permitting liquid from the hot liquid inlet to enter the said mixing chamber and a second position in which it seats against a second valve seat whereby it prevents liquid from the hot liquid inlet from entering the said mixing chamber whilst permitting liquid from the cold liquid inlet to enter the said mixing chamber, said movement not exceeding about 0.4 to 0.6 mm., and said first and second valve seats being permanently fixed against axial movement with respect to the said body.

2. A valve according to claim 1 wherein the movement of said piston does not exceed 0.5 mm.

3. A valve according to claim 1 wherein the temperature responsive device includes a diaphragm element.

4. A valve according to claim 1 wherein said body further includes a sleeve positioned within said body and secured against axial movement therein, said sleeve containing axially spaced apart passageways providing communication between the hot and cold liquid inlets and the interior of the said sleeve, the interior communicating with the said mixing chamber and the said piston being slidably contained within said sleeve and positioned between said passageways and including at least one axially extending passageway extending therethrough.

5. A valve according to claim 4 wherein said first valve seat is adjacent one said passageway communicating with said cold liquid inlet and the second valve seat is adjacent said passageway communicating with said hot liquid inlet.

6. A valve according to claim 1 wherein the piston is urged into said first position by first compression spring means and into the second position through linear expansion of the temperature responsive device in response to an increase in temperature of fluid in the said mixing chamber.

7. A valve according to claim 6 wherein linear expansion of said temperature responsive device in a direction opposite to the movement of said piston from said first to second positions, is restricted by a second compression spring means, said second spring means having a greater compression strength than the said first spring means and which acts against stop means located in said tap head.

8. A valve according to claim 7 wherein the position of the said stop means is adjustable whereby the degree of linear expansion of the temperature responsive device that can take place before said stop means acts to resist further expansion of said temperature responsive device in said direction can be varied, thereby permitting the maximum temperature of the fluid in the mixing chamber to be predetermined.

9. A valve according to claim 6 wherein linear expansion of said temperature responsive device in a direction opposite to the movement of said piston from said first to said second position is restricted by stop means located within the said tap head and said second valve seat comprises a resilient material.

10. A valve according to claim 9 wherein the resilient material is rubber having a shore hardness of about 65–75.

11. A valve according to claim 9 wherein said adjustable means provides that the degree of linear expansion of the temperature responsive device that can take place before said stop means acts to resist further expansion of said temperature responsive device in said direction can be varied, thereby permitting the maximum temperature of the fluid in the mixing chamber to be predetermined.

12. A valve according to claim 9 wherein separate means are included to select the temperature of the mixed fluids and to open and close the said shut-off valve between the mixing chamber and said mixed fluids outlet, said last mentioned means being capable of regulating the rate of flow of fluid from said mixing chamber to said mixed fluid outlet and controlled by an external manually operated volume flow control knob.

13. A valve for controlling the mixing of hot and cold water comprising;
 a hollow body having two ends and being closed at one end;
 a sleeve having top and bottom ends and located concentrically of said hollow body, one end making fluid tight engagement with the said closed end of said body;
 a first annular flange member spaced from said closed end of said body and extending between said sleeve and the walls of said body to define a first chamber between said flange and said closed end of said body;
 a second annular flange member adjacent the top end of said sleeve and extending between said sleeve and said walls to define a second chamber therebetween;
 a hot water inlet communicating with said first chamber;
 a cold water inlet communicating with said second chamber;
 a third annular flange member extending inwardly of said sleeve to define a mixing chamber in the portion of said sleeve remote from said closed end of said body;
 a face of said flange facing said closed end forming a first valve seat;
 said first chamber communicating with the inside of said sleeve via radially directed hot water passageways formed through said sleeve adjacent the closed end of said body;
 said second chamber communicating with the insides of said sleeve via radially directed cold water passageways formed through said sleeve, and adjacent said third annular flange member;
 a piston member slidably located within said sleeve for movement between,
 a first position where it seats against said first valve seat and closes said cold water passageways and permits water to flow through said hot water passageways and a second position where it seats against a second valve seat located at said closed end of said body and closes said hot water passageways and permits water to flow through said cold water passageways, said piston including axially directed passageways to permit hot water to flow therethrough, and into said mixing chamber, when said piston is in said first position;
 spring means located between said closed end of said body and the piston urging said piston into said first position;
 a tap head closing the other end of said body and including a mixed fluid outlet communicating with said mixing chamber through a shut-off valve member capable of axial movement within said body between an open position wherein water is permitted to flow from said mixing chamber into said mixed outlet and a closed position wherein said member seats on the outer end of said sleeve to prevent flow of water from said mixing chamber to said outlet;
 an externally threaded hollow spindle located in a correspondingly screw-threaded axial passageway extending through said tap head and having one end extending through said shut-off valve member;
 an externally actuable temperature control means attached to the other end of said spindle for rotation therewith;
 a temperature responsive device located in said mixing chamber between one element abutting said piston, and another element extending into said hollow spindle;
 a second compression spring member being located within said hollow spindle between the top of said other element and an axially adjustable temperature control member screw-threadedly located within said hollow spindle, said second spring having a greater compression strength than said first spring; whereby expansion of the temperature responsive device in response to an increase in water temperature in said mixing chamber, initially urges said other element and said second spring upwardly into said hollow spindle until said second spring abutts the temperature control member, and thereafter urges said first mentioned element against the said piston to move said piston against said first compression spring to seat against said hot water seat and close said hot water passageways, further expansion of the temperature responsive device then compressing said second spring;
 wherein the movement of the piston between its first and second positions is in the range of about 0.4–0.6 mm.

14. A valve according to claim 13 wherein the movement of the piston does not exceed 0.5 mm.

15. A valve according to claim 13 wherein said hollow spindle engages said shut off valve and rotation of said temperature control knob causes axial movement of said shut off valve between the fully open and fully closed positions.

16. A valve according to claim 13 wherein said shut off valve is movable axially along said hollow spindle and makes fluid tight engagement therewith; said valve further including a second hollow spindle rotatable within said tap head and extending therethrough coaxially of said first mentioned spindle and rotatable thereabout, one end of said second spindle being non-rotatably attached to a volume flow control knob located externally of said tap head for rotation therewith and the other end of said spindle being in screw-threaded engagement with said shut off valve to cause said valve to move axially within said valve body in rotation of said volume flow control knob between a first position in which it seats on the outer end of said sleeve to prevent flow of water from the said mixing chamber, and a second fully open position, whereby the rate of flow of mixed fluids through the mixed fluid outlet may be regulated.

17. A valve for controlling the mixing of hot and cold water comprising:
- a hollow body having two ends and being closed at one end;
- a sleeve having top and bottom ends and located concentrically of said hollow body, one end making fluid tight engagement with the said closed end of said body;
- a first annular flange member spaced from said closed end of said body and extending between said sleeve and the walls of said body to define a first chamber between said flange and said closed end of said body;
- a second annular flange member adjacent the top end of said sleeve and extending between said sleeve and said walls to define a second chamber therebetween;
- a hot water inlet communicating with said first chamber;
- a cold water inlet communicating with said second chamber;
- a third annular flange member extending inwardly of said sleeve to define a mixing chamber in the portion of said sleeve remote from said closed end of said body;
- a face of said flange facing said closed end forming a first valve seat;
- said first chamber communicating with the inside of said sleeve via radially directed hot water passageways formed through said sleeve adjacent the closed end of said body, said second chamber communicating with the insides of said sleeve via radially directed cold water passageways formed through said sleeve, and adjacent said third annular flange member;
- a piston member slidably located within said sleeve for movement between;
- a first position where it seats against said first valve seat and closes said cold water passageways and permits water to flow through said hot water passageways and a second position where it seats against a second valve seat located at said closed end of said body and closes said hot water passageways and permits water to flow through said cold water passageways, said piston including axially directed passageways to permit hot water to flow therethrough and into said mixing chamber, when said piston is in said first position;
- spring means located between said closed end of said body and the piston urging said piston into said first position;
- a tap head closing the other end of said body and including a mixed fluid outlet communicating with said mixing chamber through a shut off valve member capable of axial movement within said body between an open position wherein water is permitted to flow from said mixing chamber into said mixed outlet and a closed position wherein said member seats on the other end of said sleeve to prevent flow of water from said mixing chamber to said outlet;
- an externally threaded hollow spindle located in a correspondingly screw-threaded axial passageway extending through said tap head and having one end extending through said shut off valve member;
- an externally actuable temperature control means attached to the other end of said spindle for rotation therewith;
- a temperatue responsive device located in said mixing chamber between one element abutting said piston, and another element attached to said device and slidably extending into an axially directed blind end passageway formed in an adjustable temperature control member screw-threadedly located within said hollow spindle;
- whereby expansion of the temperature responsive device in response to an increase in water temperature in said mixing chamber, initially urges said other element and said second spring upwardly into said blind end passageway until said element contacts the end thereof and thereafter urges said first mentioned element against the said piston to move said piston against said first compression spring to seat against said hot water seat and close said hot water passageways,
- wherein the movement of the piston between its first and second positions is in the range of about 0.4 to 0.6 mm and the second valve seat is formed of rubber having a shore hardness of about 65 to 70.

18. A valve according to claim 17 wherein movement of the said piston does not exceed 0.5 mm.

19. A valve according to claim 17 wherein said hollow spindle engages said shut off valve and rotation of said temperature control knob causes axial movement of said shut off valve between the fully open and fully closed positions.

20. A valve according to claim 17 wherein said shut off valve is movable axially along said hollow spindle and makes fluid tight engagement therewith; said valve further including a second hollow spindle rotatable within said tap head and extending therethrough coaxially of siad first mentioned spindle and rotatable thereabout, one end of said second spindle being non-rotatably attached to a volume flow control knob located externally of said tap head for rotation therewith and the other end of said spindle being in screw-threaded engagement with said shut off valve to cause said valve to move axially within said valve body on rotation of said volume flow control knob between a first position in which it seats on the outer edge of said sleeve to prevent flow of water from the said mixing chamber, and a second fully open position, whereby the rate of flow of mixed fluids through the mixed fluid outlet may be regulated.

* * * * *